United States Patent [19]
Kobayashi et al.

[11] 3,811,345
[45] May 21, 1974

[54] ADAPTIVE CONTROL SYSTEM FOR NUMERICAL CONTROL

[75] Inventors: Kengo Kobayashi, Kawasaki; Seiichi Hattori, Tokyo; Masaharu Tamura, Yokohama, all of Japan

[73] Assignee: Fujitsu Limited, Kawasaki-shi, Japan

[22] Filed: Dec. 27, 1971

[21] Appl. No.: 211,891

[30] Foreign Application Priority Data
Dec. 31, 1970 Japan.............................. 45-123266

[52] U.S. Cl............................................... 82/2 B
[51] Int. Cl.............................................. B23b 3/00
[58] Field of Search ..................................... 82/2 B

[56] References Cited
UNITED STATES PATENTS

| | | | |
|---|---|---|---|
| 3,545,310 | 12/1970 | Porath et al. | 82/2 B |
| 2,907,937 | 10/1959 | Apgar et al. | 82/2 B |
| 2,892,526 | 6/1959 | Dovaud | 82/2 B |
| 3,595,106 | 7/1971 | Poimella | 82/2 B |
| 3,641,849 | 2/1972 | Kinney | 82/2 B |
| 3,746,955 | 7/1973 | Kobayashi | 82/2 B |

Primary Examiner—Harrison L. Hinson
Attorney, Agent, or Firm—Maleson, Kimmelman & Ratner

[57] ABSTRACT

Adaptive control system for a numerical control machine tool like a lathe with a control program which contains the information about the outline of raw workpiece prior to blocks commanding the desired outline of the manufactured workpiece. The length of movements of the bit of said machine towards the direction of the center of said workpiece at the beginning of the cutting is controlled in a manner such that the cutting depth of said bit is shorter than the length of the cutting edge of said bit, and the load of said machine in the cutting operation is controlled so as to be equal to the upper limit of the allowable load. The system of the present invention provides prevention of damage to the bit, a shorter manufacturing time and improved operation efficiency of said machine.

5 Claims, 10 Drawing Figures

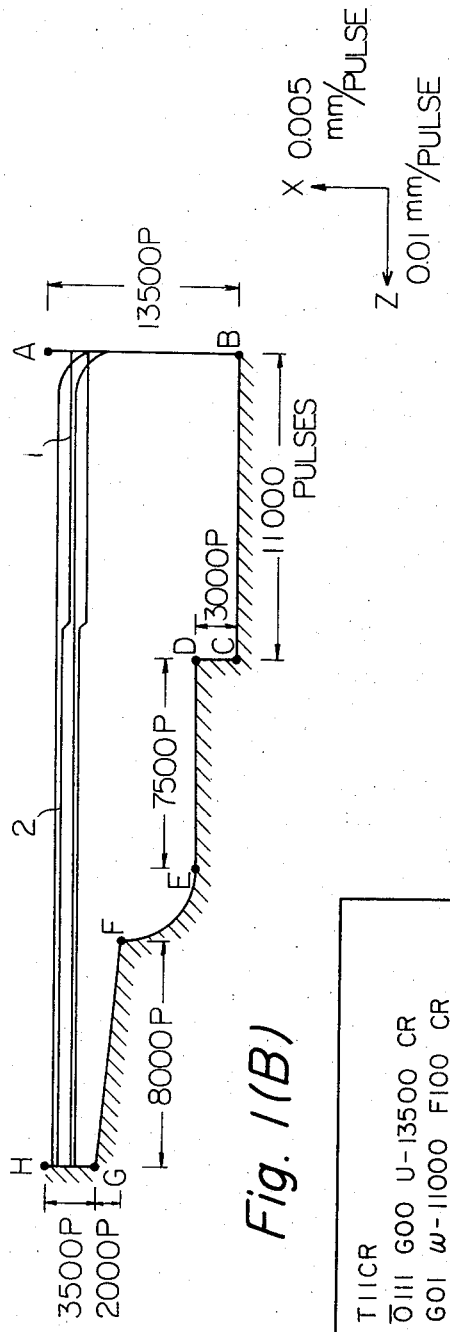

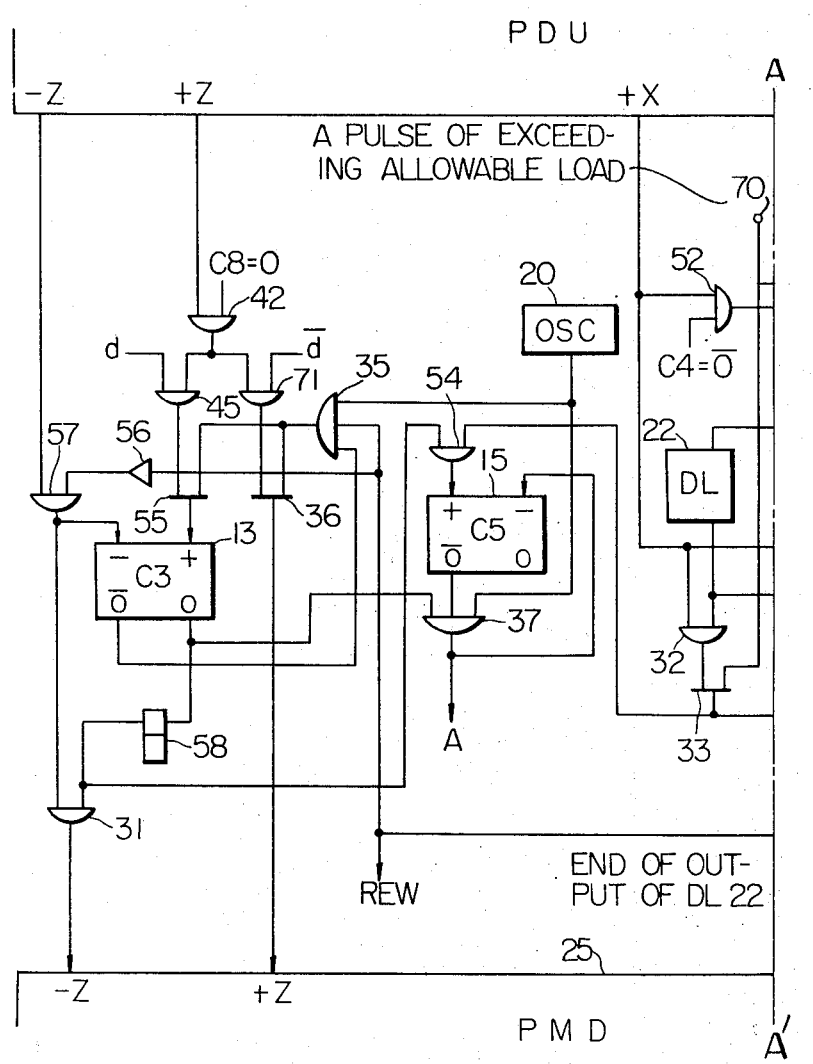
Fig. 2-(1)
| Fig. 2-(1) | Fig. 2-(2) |

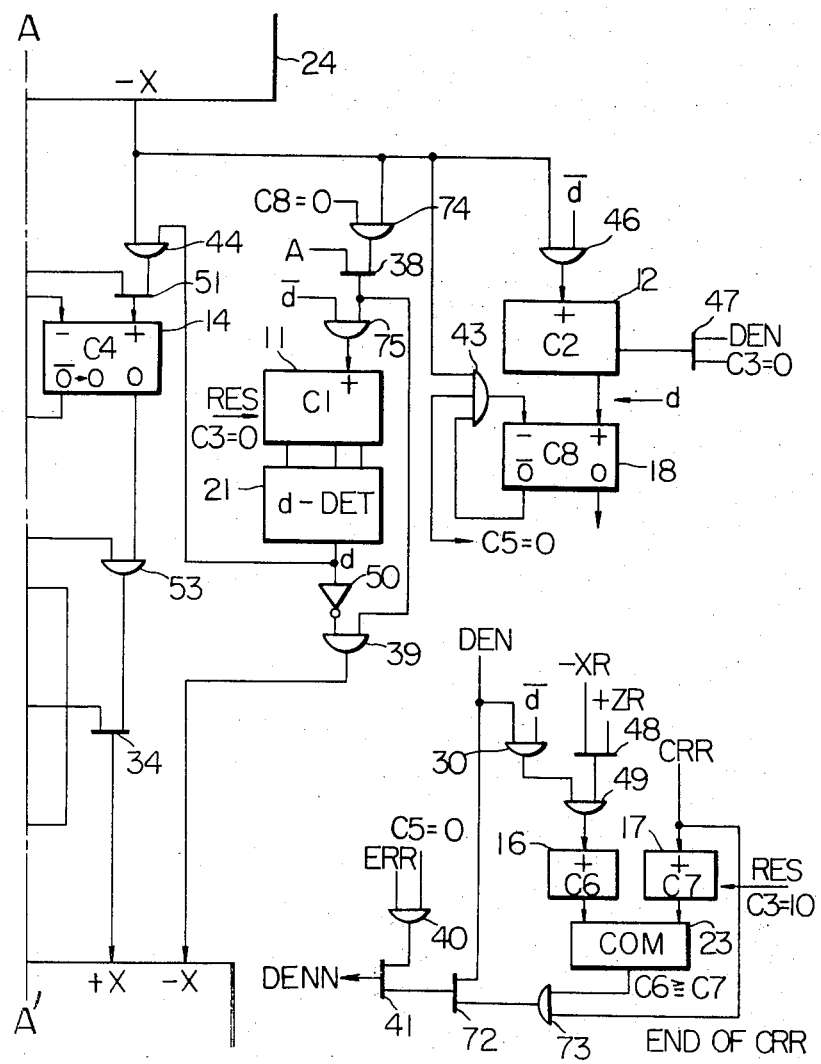
Fig. 2-(2)

ADAPTIVE CONTROL SYSTEM FOR NUMERICAL CONTROL

The present invention relates to a system of control of a numerical control machine tool, like a lathe, more particularly relates to a system which avoids breaking the bit and which reduces the period during which the tool stops.

In the prior art, when the torque load on the main spindle exceeds the allowable limit, the tool is controlled so as to remove the bit from the workpiece, thus reducing the load torque, and then the optimum load which is made equal to the upper allowable load is maintained which enables the machine to be used with maximum efficiency (for instance, Japanese patent application 45-24594).

However, in said prior art, as the bit is controlled to move and cut along the predetermined final outline of the workpiece, the unbladed part of the bit is apt to touch and strike the workpiece. Also, there is the disadvantage that the bit sometimes breaks because the unbladed part of the bit is not so strong as the cutting edge of the bit.

The object of the present invention is, therefore, to provide a system which overcomes the above-mentioned drawbacks.

A further object of the present invention is to provide an adaptive control system which prevents damage to the bit and automatically selects the optimum depth of the bit into the workpiece, by selecting the first depth of the bit into the workpiece in relation to the edge of the bit.

A further object of the present invention is to provide an adaptive control system which reduces the period that the tool stops and thus shorten the manufacture time.

According to the present invention, an adaptive control system for numerical control is controlled by a program tape which has an information block about the raw outline of the workpiece preceding an application block concerning the manufactured outline of the workpiece. The first depth to which the bit cuts the workpiece towards the center of the workpiece at the start of the cutting is selected so as to be less than or equal to the cutting edge of the bit. Said cutting depth of the bit into the workpiece is controlled so that the load on the main shaft is held equal to the upper limit of the allowable load. The next cutting depth is selected so as to equal said first cutting depth as taken from the base point to which the bit returns after the preceding cutting. Furthermore, in the program block from the beginning to the end, a block, once distributed is not distributed again in the succeeding processes, but said block provides the distribution end signal just after said block is read, and the next block is immediately read and distributed.

Further features and advantages of the present invention will be apparent from the ensuring description with reference to the accompanying drawings to which, however, the scope of the invention is in no way limited.

FIG. 1 shows the embodiment of the outline of a raw workpiece and the program for cutting said raw workpiece according to the present invention;

FIG. 2 shows a blockdiagram of the embodiment of the control unit for an adaptive control system for numerical control according to the present invention;

FIG. 1 is one embodiment of the outline of the raw workpiece, and the program to make the manufactured workpiece having the hatched outline B-C-D-E-F-G-H. The cutting is generally done along the line 1 of FIG. 1, but in the case where the torque load on the main shaft exceeds the allowable limit, the cutting is done along line 2 moving the bit in the X direction.

Figure 3:
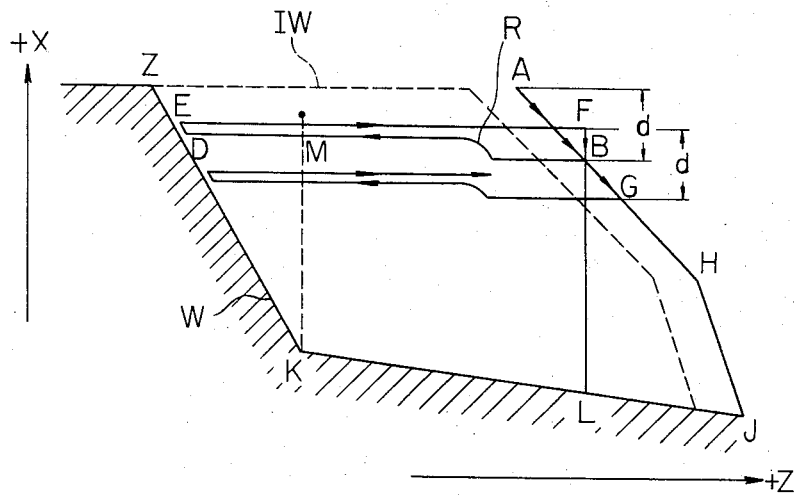
FIG. 3 is one embodiment of the outline of a raw workpiece, the programmed path of the bit and the actual path of travel of the cutting edge of the bit.

FIG. 1B shows an actual program for said cutting. Said program is coded with FANUC240 program language. First said program is explained below. On the first line there is the code "T11CR" where T is selection code of a tool, 11 is tool number and dial number revising a tool, CR is a block end mark.

On the second line, there is the code "$\overline{0}$111 G00 U-13500CR", where $\overline{0}$ is a mark indicating the start of an adaptive mode, 111 is the reference number of the program tape, G00 commands the high speed sending of a tool, U-13500 commands a tool in the −U direction (which is equal to the −X direction) for a length corresponding to 13500 pulses, and CR is a block end mark. The second line shows the outline of the raw material. The presence of the second line is one of the features of the present invention.

On the third line, there is the code "G01 w-11000 F100CR", which corresponds to the cutting between B and C in FIG. 1A. Where G01 commands linear cutting, w-11000 commands a tool in the −w direction (which is equal to −Z direction) for a length corresponding to 11000 pulses, F100 commands a tool to be sent at a speed of 100 mm per each revolution of the main spindle, and CR is a block end mark.

On the fourth line, there is the code "U3000CR," which corresponds to the cutting between C and D in FIG. 1A, where U3000 commands a tool in the −U direction for a length corresponding to 3000 pulses, and CR is a block end mark.

On the fifth line, there is the code "w-7500CR," which corresponds to the cutting between D and E, where w-75000 commands a tool in the −w direction for a length corresponding to 7500 pulses, and CR is a block end mark.

On the sixth line, there is the code "G02U5000 w-2500i2500 CR," which corresponds to the cutting between E and F of FIG. 1A, where G02 commands a circular cutting, U5000 w-2500 indicates that the cutting length of the bit corresponds to 5000 pulses in the +U direction and 2500 pulses in the −w direction, i2500 shows the coordinates of the center of an arc relative to the starting point of said arc, and CR is a block end mark.

On the seventh line, there is the code "G01U2000 w-8000CR," which corresponds to the cutting between F and G, where G01 commands linear cutting, U2000 w-8000 commands a tool in the +U direction for a length corresponding to 2000 pulses and in the −w direction for a length corresponding to 8000 pulses, and CR is a block end mark.

On the eighth line, there is the code "U3500CR," which corresponds to the cutting between G and H of FIG. 1A, where U3500 commands a tool in the +U direction for a length corresponding to 3500 pulses, and CR is a block end mark.

And on the last line, there is the code "M90CR," which shows a program end, where M90 shows the end of an adaptive mode, and CR is a block end mark.

As mentioned above; it is one of the features of the present invention that a block "0̄111 U-13500CR" giving the outline of raw workpiece appears before the application blocks which command the desired outline of the manufactured workpiece.

Although the program of FIG. 1B is coded with FA-NUC240 program language, the application of the present invention is not limited to that language, i.e., any program langauge for numerical control is useable.

FIG. 2 shows a blockdiagram of the embodiment of the control unit for an adaptive control system for numerical control according to the present invention. In FIG. 2, the reference numbers 11 – 18 are counters, where 13, 14, 15 and 18 are reversible counters. OSC 20 is a square wave oscillator which provides an output voltage at a predetermined frequency, $d$-DET 21 is a detection means which operates when the content in counter 11 reaches a predetermined value $d$, DL 22 is a delay means which provides an output signal at a predetermined period after an input signal is applied. COM 23 is a comparison circuit which compare the two contents in counters 16 and 17, and provides an output signal when $C_6 \geq C_7$. DEN is a pulse distribution end signal, ERR, CRR, −XR and +ZR are signals which show that the signals ER, CR, −X and +Z have been read from the program tape respectively. The signal ER is written at the start of a program tape, and the signal CR is written at the end of every block of program tape. The signal RES indicates reset. PDU24 is a pulse distribution unit, PMD 25 is a drive circuit for a pulse motor, and the signal REW commands the rewind of a program tape.

In FIG. 2, a pulse distribution unit 24 provides four outputs +X, −X, +Z and −Z. The output signal −X is applied to one of the input terminals of AND gates 74, 43, 44 and 46. The output signal +X is applied to one of the input terminals of AND gates 32, 52 and 53. The output signal +Z is applied to one of the input terminals of AND gate 42. The output signal −Z is applied to one of the input terminals of AND gates 57. The negative polarity $\bar{d}$ of the output $d$ of $d$-DET 21 is applied to the other input terminal of AND gates 46. The output of AND gate 46 is applied to the input of counter $(C_2)$ 12 as an additive signal. Counter $(C_2)$ 12 is reset to zero when a pulse distribution end signal DEN appears or a counter $(C_3)$ 13 becomes zero. The output of counter $(C_2)$ 12 is applied to the positive terminal of counter $(C_8)$ 18. Counter $(C_8)$ 18 provides one output signal when its content is not zero, and said output signal is applied to the second input terminal of AND gate 43. A signal which appears when the content of counter $(C_5)$ 15 is zero is applied to the third input terminal of AND gate 43 and the output of AND gate 43 is applied to the negative terminal of counter $(C_8)$ 18. A signal which appears when the content of counter $(C_8)$ 18 is zero is applied to the second input terminal of AND gate 74. And the output of AND gate 74 is applied to the inputs of AND gates 75 and 39 through OR gate 38 together with the output A of AND gate 37. The output of AND gate 37 is also applied to the negative terminal of counter $(C_5)$ 15. The negative polarity $\bar{d}$ of the output d of $d$-DET 21 is applied to the second input terminal of AND gate 75, the output of AND gate 75 is applied to the input terminal of a counter $(C_1)$ 11, the output of counter $(C_1)$ 11 is applied to the input terminal of $d$-DET 21. Counter $(C_1)$ 11 is cleared to zero when the content of counter $(C_3)$ 13 becomes zero. The output of $d$-DET 21 is applied to the second input of AND gate 39 through an inverter 50. The output of AND gate 39 is connected to the −X terminal of a pulse motor drive circuit (PMD) 25. The output of $d$-DET 21 is also connected to the second input terminal of AND gate 44, the output of which is applied to OR gate 51. A pulse signal which appears when the torque load on the main spindle of a tool exceeds the allowable limit, is applied to terminal 70. Terminal 70 is connected to the positive terminal of counter $(C_4)$ 14 through OR gate 51, and also connected to one of the input terminal of each of OR gate 34 and AND gate 54 through OR gate 33. A signal indicating that the content of counter $(C_4)$ 14 is not zero is applied to the second input of AND gate 52, the output of which is applied to the negative input of counter $(C_4)$ 14. A crunter $(C_4)$ 14 counts the distribution pulses in the +X direction, and the output which indicate that its content is zero is applied to the X input of the pulse motor drive circuit (PMD) 25 through AND gate 53 and OR gate 34. The counter $(C_4)$ 14 provides a short output signal immediately after its content becomes zero, and this short output is applied to AND gate 32 through delay means (DL) 22. The output of AND gate 32 is connected to the input of OR gate 33. The differentiated trailing edge signal of the output of delay means (DL) 22 becomes a tape rewind signal (REW), and also is applied to the input of AND gate 57 through inverter 56, and AND gate 35. An oscillator (OSC) 20 provides pulse signals of a predetermined frequency, the output of which is applied to the inputs of both AND gates 35 and 37. The output of a flip-flop 58 is applied to the second input of AND gate 54, the output of AND gate 54 is applied to the positive input of counter $(C_5)$ 15. Counter $(C_5)$ 15 counts the pulses corresponding to the length of movement of a tool in the +X direction as a function of excess of torque over the allowable torque. The output which indicates that the content of counter $(C_5)$ 15 is not zero is applied to the second input of AND gate 37. A signal which indicates that the content of counter $(C_8)$ 18 is zero is applied to the second input of AND gate 42, the output of AND gate 42 is applied to the inputs both of AND gate 45 and 71. The output of AND gate 45 together with the output of AND gate 35 is applied to the positive input of counter $(C_3)$ 13 through OR gate 55. The output of AND gate 71 plus the output of AND gate 35 is applied to the +Z input of a pulse motor drive circuit (PMD) 25 through OR gate 36. The output of AND gate 57 is applied to the negative input of counter $(C_3)$ 13, and also applied to the −Z terminal of the pulse motor drive circuit (PMD) 25 through AND gate 31. Counter $(C_3)$ 13 counts the distribution pulses in the +Z direction. An output signal which indicates that the content of counter $(C_3)$ 13 is zero is applied to the input of AND gate 37 and also a flip-flop 58, while an output of counter $(C_3)$ 13 which indicates that the content is not zero is applied to the third input of AND gate 35. The output of flip-flop 58 is also applied to the second input of AND gate 31.

Conversely, signals −XR and +ZR are applied to the first input of AND gate 49 through OR gate 48, the signal CRR is applied to the input of counter ($C_7$) 17, and is also applied to the first input of AND gate 73. The pulse distribution end signal DEN is applied to the first input of AND gate 30 and the input of OR gate 72. The negative polarity output $\bar{d}$ of $d$-DET 21 is applied to the second input of AND gate 30, the output of which is applied to the second input of AND gate 49, the output of which is applied to the input of counter ($C_6$) 16. Each output of counter ($C_6$) 16 and counter ($C_7$) 17 is applied to the corresponding input of a comparison circuit 23. Said comparison circuit provides an output signal when the content of counter ($C_6$) 16 is equal to or larger than that of counter ($C_7$) 17 [($C_6$) ≧ ($C_7$)]. Said output signal is applied to the second input of AND gate 73. The output of AND gate 73 provides signal DENN through OR gates 73 and 72. A signal which indicates that the contents of counter ($C_5$) 15 is zero is applied to the input of AND gate 40, the output of which is applied to the input of OR gate 41.

FIG. 3 shows one embodiment of the outline of a raw workpiece, the programmed path of the bit, and the actual path of travel of the cutting edge of the bit. The embodiment of FIG. 3 is an example showing the raw material having a dotted outline IW cuts and resulting in the hatched outline J-L-K-Z. The arrow A-H-J or B-D-E-F shows the actual path of travel of the cutting edge of the bit.

Figure 4:
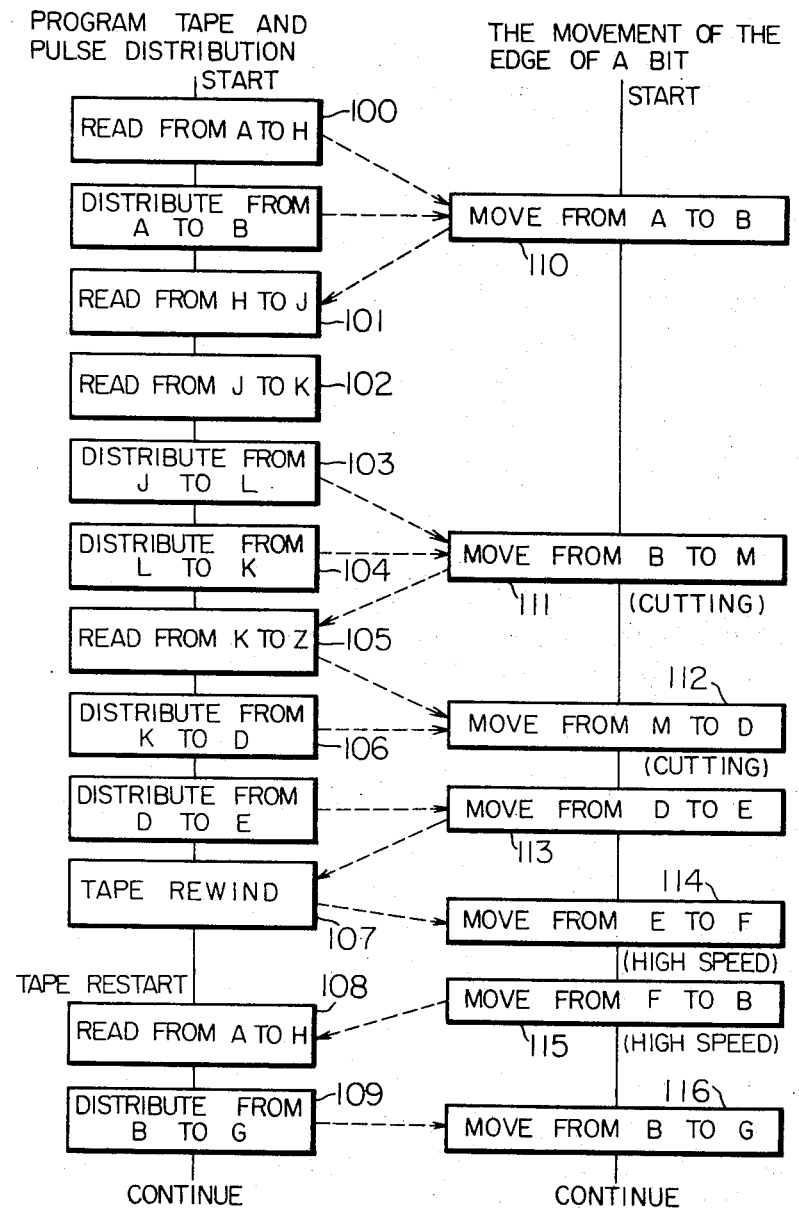
FIG. 4 is a flow-chart showing the operation when the raw workpiece of FIG. 3 is cut.

FIG. 4 is a flow chart showing the operation of a program tape and the cutting edge of the bit when the dotted outline of the raw workpiece of FIG. 3 is cut to the hatched outline J-L-K-Z. As mentioned above in FIG. 2, a program tape has a block with information about the outline of the raw workpiece at the beginning of the program and the following blocks are about the manufactured outline of the workpiece.

In FIG. 4, when the first block from A to H of the tape has been read in accordance with reference number 100, the content of counter ($C_7$) 17 becomes 1, and the bit will move from A in the H direction in accordance with reference number 110. The value $d$ is predetermined corresponding to the cutting edge of the bit, and the bit can not move a distance greater than $d$ from the base point in the −X direction. In the cutting operation, when the torque load on the bit exceeds the allowable limit, said bit returns in the +X direction thus reducing the cutting depth, and said bit moves in the −Z direction under the maximum allowable torque. When said bit reaches the predetermined point on the desired outline, said bit returns in the +Z direction, then said bit moves from the point in the −X direction for a distance equal to the predetermined length $d$. Repeating this, the cutting is progressed.

Next, the operation is explained with reference to FIG. 2, FIG. 3 and FIG. 4. During the time the bit is moving from A in the H direction in FIG. 3, the distribution pulses in the −X direction are counted by counters ($C_1$) 11 and ($C_2$) 12. When the content of counter ($C_1$) 11 reaches a value corresponding to the predetermined value $d$, the detection means ($d$-DET) 21 provides an output signal, and the pulse motor stops its movement in the −X and +Z directions (point B in FIG. 3, reference number 110 in FIG. 4). At the same time counter ($C_2$) 12 stops counting, and its content is transferred to counter ($C_8$) 18. During the time that the bit is stopped, pulse distribution unit (PDU) 24 distributes pulses from B to H, said distribution pulses along the −X axis and +Z axis are counted by counters ($C_4$) 14 and ($C_3$) 13, respectively. When said distribution finishes at point H in FIG. 3, a block end mark CR provides a distribution end signal DEN (FIG. 2). However, as the output of $d$-DET 21 is 1 and the output of AND gate 30 is zero, counter ($C_6$) 16 does not respond. When the next block from H to J (101 of FIG. 4) is read, the content of counter ($C_7$) 17 becomes 2, and the distribution in the −X and +Z directions is performed, said distribution pulses still being counted by counters ($C_4$) 14 and ($C_3$) 13. At this time, as the detecting means $d$-DET 21 is still providing an output signal, the content of counter ($C_6$) 16 is maintained at zero, thus comparison circuit (COM) 23 provides no output, and signal CRR can not provide the pulse distribution end signal DENN. Next, as the tape block from J to K is read (102 in FIG. 4), the distribution pulses in the −Z direction are subtracted from the content of counter ($C_3$) 13. Continuing the distribution between J and K, when said distribution has reached the point L which has the same Z coordinates that of point B, the bit stops at point B (103 in FIG. 4), the content of counter ($C_3$) 13 becomes zero, pulses are distributed between L and K (104 in FIG. 4), and AND gate 31 opens, the bit cuts from B towards M along the −Z axis. In the cutting operation, if the torque load exceeds the predetermined allowable limit, said bit goes in the +X direction at a speed corresponding to the excess torque (point R in FIG. 3). The number of pulses corresponding to said movement in the +X direction are added to counter ($C_4$) 14, and also added to counter ($C_5$) 15. Generally, the number of pulses corresponding to the movement in the +X direction as a function of excessive torque load on the main spindle is counted by counters ($C_4$) 14 and ($C_5$) 15. After the bit reaches the point M, the tape block from K to Z is read (105 in FIG. 4), and the distribution of pulses, continues and the bit goes from M to D (112 in FIG. 4). In blocks from J to K and from K to Z, the distribution pulses in the +X direction are subtracted from the content of counter ($C_4$) 14. The movement of the bit in the −Z direction is decided by the relevant distribution pulses. When the bit reaches the point D of FIG. 3 where the tape program commands the bit to stop, the content of counter ($C_4$) 14 becomes zero, and then the delay means 22 (FIG. 2) immediately provides an output signal for a predetermined period, and then the distribution pulses in the +X direction are directly applied to the pulse motor drive circuit 25 through AND gate 32, OR gate 33 and OR gate 34. Consequently, the bit goes from D to E along the programmed path (113 in FIG. 4), and the distribution pulses in the +X direction for this period are added to the content of counter ($C_5$) 15 through OR gate 33. When the output signal of delay means 22 becomes zero (the bit is at point E in FIG. 3 at this time), the bit stops and at the same time the signal REW rewinds the program tape (107 in FIG. 4). And oscillator 20 applies its output signal through AND gate 35 and OR gate 36 to the Z terminal of the pulse motor drive circuit 25 and through AND gate 35 and OR gate 55 to counter ($C_3$) 13, and then the bit goes in the +Z direction (114 in FIG. 4), and the content of counter ($C_3$) 13 is added to the pulses corresponding to the movement of the bit. The movement of the bit at this time is high speed and said bit goes from E to F. When the bit has reached point F whose Z coordinate is equal to that of B, the content of counter ($C_3$) 13 becomes zero and AND gate 35 closes and then the movement of the bit in the +Z direction stops. At the same time the contents of counters of ($C_1$) 11, ($C_2$) 12 and ($C_7$) 17 are all reset to zero.

Next, the oscillator 20 applies a square wave signal through AND gate 37, OR gate 38 and AND gate 39 to the −X terminal of the pulse motor drive circuit 25, and then the bit goes in the −X direction (115 in FIG. 4), and the number of pulses is counted by counter ($C_1$) 11 and at the same time these pulses subtracted from the content of counter ($C_5$) 15. When the bit reaches point B the content of counter ($C_5$) 15 becomes zero, and then AND gate 37 closes and the movement of the bit in the −X direction stops. Also as pulse distribution end signal DENN is provided through AND gate 40 and OR gate 41, the program tape starts again. When the block from A to H is read (108 in FIG. 4), the distribution of pulses in the −X and +Z direction begins, however, as the content of counter ($C_8$) 18 is not zero at this time, AND gate 74 and 42 are closed and therefore the bit does not move. The distribution pulses in the −X direction are counted by counter ($C_2$) 12. The output signal from AND gate 43 is subtracted from the content of counter ($C_8$) 18. When the distribution of pulses has reached point B where the bit stops (109 in FIG. 4), the content of counter ($C_8$) 18 becomes zero, and because AND gate 74 and 42 open, the bit goes along the programed path (116 in FIG. 4), and counter ($C_1$) 11 begins to count again. When the content of counter ($C_1$) 11 reaches the predetermined value $d$, detection means ($d$-DET) 21 provides an output signal, and then the bit stops and the content of counter ($C_2$) 12 is substituted for the content of counter ($C_8$) 18, and at the same time counters ($C_1$) 11 and ($C_2$) 12 stop. Also AND gate 44 opens, starting the operation of counters ($C_3$) 13 and ($C_4$) 14, the bit starts to move and cut in the −Z direction in the same way as mentioned above. The cutting operation continues repeating the above-mentioned cycle.

Figure 5:
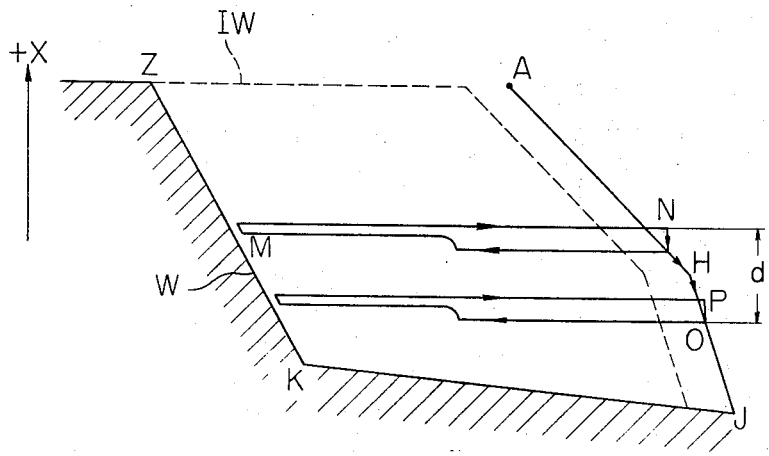
FIG. 5 shows the path of travel the cutting edge of the bit when the cutting in FIG. 3 is half finished.

When the block from A to H has been read after the bit goes N → M → H in FIG. 5, the content of counter ($C_2$) 12 is reset to zero and the content of counter ($C_6$) 16 becomes 1. Next, when the program block from H to J is read, the bit goes to point O when the content of counter ($C_1$) 11 reaches the predetermined value $d$, and after that said bit goes in the −Z direction in the same manner as mentioned above, and returns to point O, and the program tape starts again. When the CR of the block from A to H is read, the distribution end signal DEN is immediately provided and the next block is read because of the presence of the output signal of comparison circuit 23. When the CR of the next block is read, the content of counter ($C_6$) 16 becomes 1 and the content of counter ($C_7$) 17 becomes 2. The output of the comparison circuit 25 and the distribution end signal DEN then disappear, and the distribution from H to J starts again.

If it occurs that the bit reaches the point Z while the content of counter ($C_4$) 14 stays at zero for one complete cycle, it means that the bit cuts along the programed path from J through K to Z.

Figure 6:
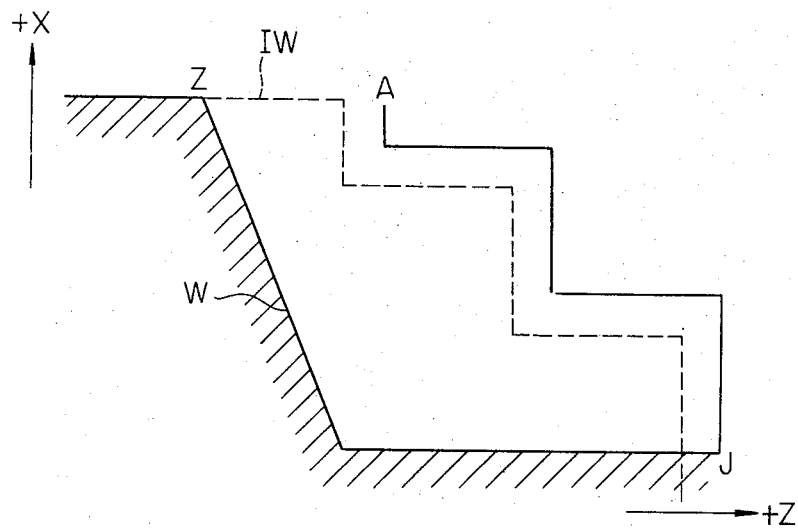
FIG. 6 – FIG. 8 show other embodiments of the outlines of the raw material, the programmed path of the bit and the actual path of travel of the cutting edge of the bit.
Figure 7:
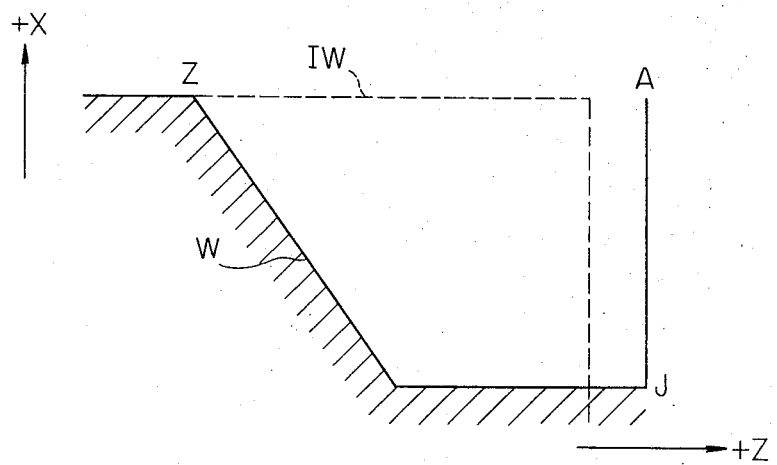

FIG. 6 and FIG. 7 show that there are some blocks containing only a −X or a +Z component. In such cases the program tape commands the path from A through J to Z along the outline of the raw workpiece in the same manner as mentioned above, and, the bit goes for the predetermined depth $d$ into the raw workpiece.

Figure 8:
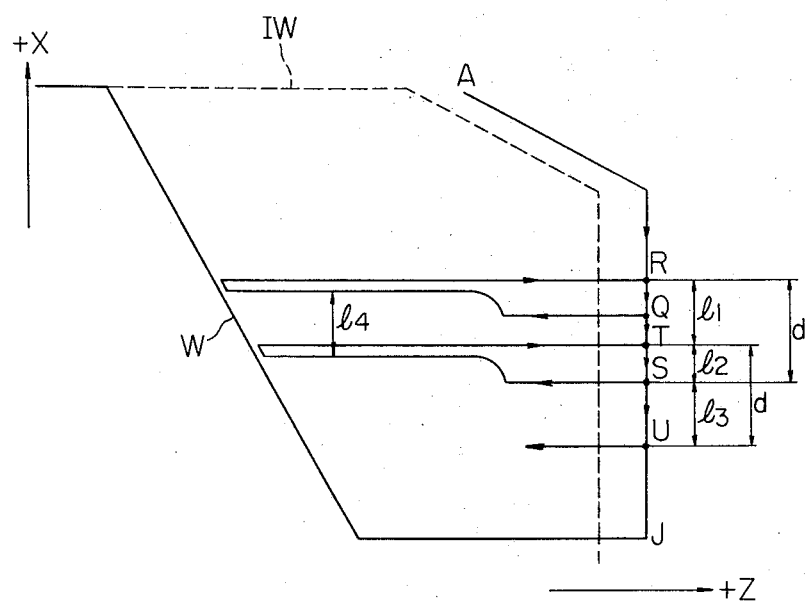

FIG. 8 shows another embodiment of the raw workpiece where the bit goes Q → R → S → T → U. Supposing the length $l_4$ is the optimum depth of cutting $d_{opt}$, as $l_4 = l_1$, the length $l_1$ is also equal to the optimum depth of cutting $d_{opt}$. And as $l_1 + l_2 = l_2 + l_3 = d$, the cutting depth from S to U is also equal to the optimum depth of cutting $d_{opt}$. Consequently the cutting depth is (automatically) controlled to the optimum value $d_{opt}$.

As mentioned above, the adaptive control system for numerical control according to the present invention provides the optimum cutting depth for the bit and in which the raw workpiece touches only the cutting edge of said bit, thus preventing damage to said bit. Said features are performed by the program which has a block with information about the outline of the raw workpiece preceding the blocks about the desired outline of the manufactured workpiece. And after the first cutting cycle has been finished, the following cutting cycles are performed at the optimum cutting depth. Further the distribution of pulses is made only once for every block, and when a block already distributed has been read, the distribution of pulses for said block is not made again and the next block is immediately read and distributed, which shortens the time during which the bit stops for the redistribution period. And thus the manufacturing time is shortened and the efficiency of the machine is improved.

What is claimed is:

1. An adaptive control system for a numerical control machine which controls the cutting depth of a cutting bit so that the load on the machine in operation is less than an upper allowable value, comprising:
   command data supply means to supply command data relating to the outline of a raw workpiece which precedes the command data relating to the desired outline of a manufactured workpiece,
   a pulse distribution unit to supply distribution pulses according to the command data,
   a motor drive circuit to drive a motor,
   control means connected electrically to said pulse distribution unit and motor drive circuit to process said distribution pulses,
   said control means comprising a first pulse generator to provide output pulses which control the cutting bit to move from the center of a workpiece in a +X direction when the torque exceeds said allowable value.
   detection means to detect whether the cutting depth is equalized to a present value which is shorter than the length of the bladed part of the cutting bit,
   a first counter for providing an addition of one to its contents every time distribution pulses in a +Z direction generate after the cutting depth reaches said preset value and providing a subtraction of one from the contents thereof every time direction pulses generate after the cutting depth reaches said preset value,
   a second counter for providing an addition of one to its contents every time either of the distribution pulses in a −X direction or the output pulses of said first pulse generator generate after the cutting depth reaches said preset value and providing a subtraction of one from its contents every time distribution pulses in a +X direction generate after the cutting depth reaches said preset value, first gate means to prevent the distribution pulses in the —Z direction from going to said motor drive circuit during the period from the time that said cutting depth reaches said preset value to the time that the content of said first counter reaches zero, second gate means to prevent the distribution pulses in the +Z direction from going to said motor drive circuit after the cutting depth reaches said preset value, third gate means to prevent the distribution pulses in the +X direction from going to said motor drive circuit during the period from the time the cutting depth reaches said preset value to the time the content of said second counter reaches zero, and fourth gate means to prevent the distribution pulses in the —X direction from going to said motor drive circuit after the cutting depth reaches said preset value.

2. The adaptive control system for a numerical control machine according to claim 1 wherein said control means further comprises delay means which provides an output signal during a predetermined period after the content of said second counter reaches zero, and a fifth gate means which supplies distribution pulses to said motor drive circuit during the time the output signal from said delay means exists.

3. The adaptive control system for a numerical control machine according to claim 2 wherein said control means further comprises:

a second pulse generator which provides a predetermined frequency signal, a third counter which accumulates distribution pulses in the +X direction furing the time the output of said delay means exists, and pulses which said first pulse generator provides after the torque exceeds the allowable value, sixth gate means to count up said first counter every time said second pulse generator provides output pulses after said delay period finishes and to move the tool toward the starting point of the cutting operation in the +Z direction according to the output pulses from said second pulse generator until the content of the same reaches zero, and seventh gate means to subtract the content of the third counter every time said second pulse generator provides pulses after the content of the first counter reaches zero, and to move the tool toward the starting point of cutting operation in the —X direction according to the output pulses from said second pulse generator.

4. The adaptive control system for a numerical control machine according to claim 3 wherein said detection means comprises:

a fourth counter to count pulses in the —X direction applied to said motor drive circuit, a detector to detect when the content of the fourth counter reaches the predetermined value, a fifth counter which accumulates the distribution pulses in the —X direction until the cutting depth reaches the preset value and is cleared to zero just when the content of first counter reaches zero, and a sixth counter which receives the content of said fifth counter when the cutting depth reaches the preset value, and is subtracted from the distribution pulses in the —X direction until the content of the sixth counter reaches zero during the period when the content of said third counter is zero.

5. The adaptive control system for a numerical control machine according to claim 4 further comprising:

a seventh counter which counts up every time the block end signal between two command data is read and is cleared to zero when the content of the first counter reaches zero, an eighth counter to count the distribution end signal during the period when the cutting depth is not equal to the predetermined value, and a comparator to compare the content of the seventh counter with the content of the eighth counter, whereby the pulse distribution is not performed on the condition that the content of the seventh counter is not larger than the content of the eighth counter during the program blocks from the starting point of the program to the end point of the outline of the workpiece, but a distribution end signal is immediately provided and the next command data on the program tape is read.

* * * * *

FORM PO-1050
(5/69)

UNITED STATES PATENT OFFICE
CERTIFICATE OF CORRECTION

Patent No. 3,811,345          Dated May 21, 1974

Inventor(s)    K. Kobayashi et al

It is certified that error appears in the above-identified patent and that said Letters Patent are hereby corrected as shown below:

In claim 1, line 21, change "present" to --preset--.

Signed and sealed this 19th day of November 1974.

(SEAL)
Attest:

McCOY M. GIBSON JR.          C. MARSHALL DANN
Attesting Officer            Commissioner of Patents